A. S. COUSIN.
HOSE CLAMP.
APPLICATION FILED FEB. 19, 1913.
1,070,418.
Patented Aug. 19, 1913.
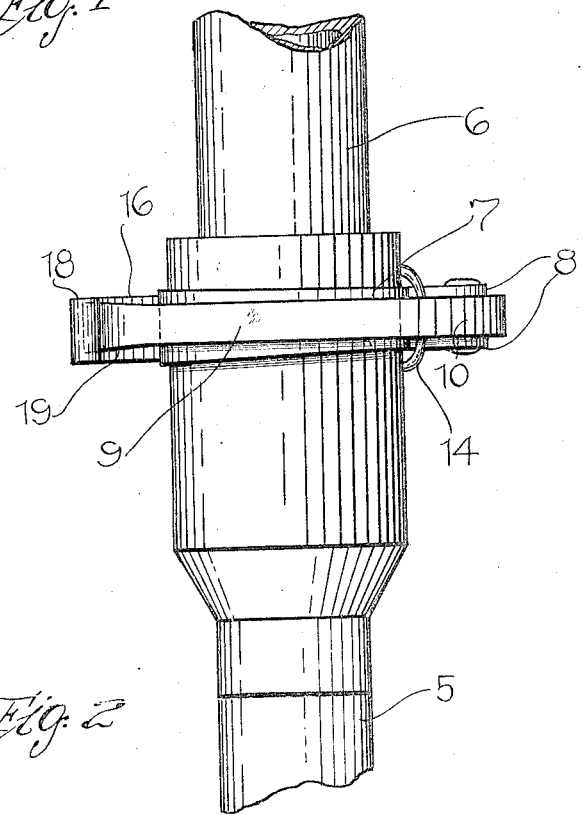
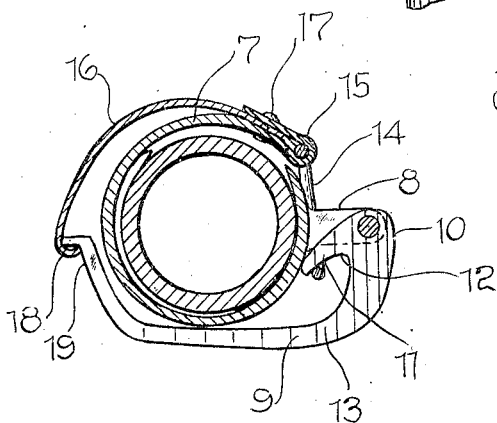
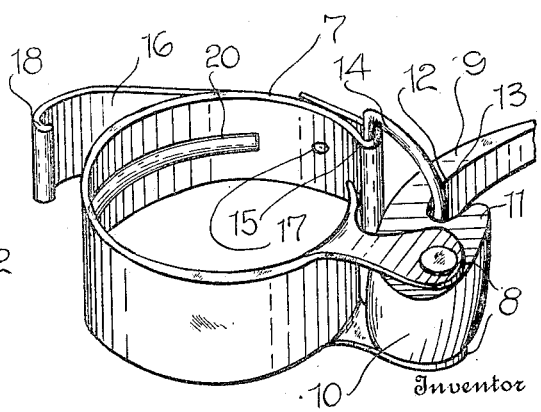
Witnesses
Robert M. Sutphend.
A. J. Hind.
Inventor
Arthur S. Cousin
By Watson E. Coleman
Attorney

UNITED STATES PATENT OFFICE.

ARTHUR S. COUSIN, OF ROSEBANK, NEW YORK.

HOSE-CLAMP.

1,070,418.

Specification of Letters Patent. Patented Aug. 19, 1913.

Application filed February 19, 1913. Serial No. 749,467.

*To all whom it may concern:*

Be it known that I, ARTHUR S. COUSIN, citizen of the United States, residing at Rosebank, in the county of Richmond and State of New York, have invented certain new and useful Improvements in Hose-Clamps, of which the following is a specification, reference being had to the accompanying drawings.

This invention relates to an improved hose clamp and more particularly to very simple, durable and efficient devices for securely clamping flexible gas hose to the pipe of a gas stove.

Another object of the invention is to provide a novel construction of clamp for the above purpose which may be easily and quickly actuated to securely clamp the end of the flexible hose to the pipe of the stove and which will effectually prevent the accidental detachment of the hose from the pipe when the stove is moved from place to place.

Still another object of the invention is to provide a hose clamp which may be used upon hose of various sizes, and may be produced at small manufacturing cost.

With the above and other objects in view as will become apparent as the description proceeds, the invention consists in certain constructions, combinations and arrangements of the parts that I shall hereinafter fully describe and claim.

For a full understanding of the invention, reference is to be had to the following description and accompanying drawing, in which—

Figure 1 is a side elevation illustrating my improved clamp applied to the end of a flexible gas hose or tube, to secure the same to the pipe of a gas stove. Fig. 2 is an enlarged section taken on the line 2—2 of Fig. 1; and Fig. 3 is a perspective view of the clamp removed from the hose.

Referring in detail to the drawing, 5 designates the flexible hose or tubing which is connected at one of its ends in the usual manner to the main gas pipe. The other end of this tube is adapted to receive the nipple on the end of the pipe 6 of a gas stove. Owing to the frequent attachment and detachment of the tubing to or from the pipe of the stove, said tubing soon loses its resiliency so that the tube will easily slip off of the pipe should the same be accidentally struck, thus allowing the gas to escape into the room. In order to effectively overcome the liability of accidental detachment of the tubing from the pipe of the stove and to obviate leakage of the gas from the attached end of the tubing, I provide a clamping band indicated at 7. This band is made of any suitable resilient sheet metal and is split to provide separated end portions. Adjacent to one end of the band, the same is provided upon its opposite edges with the ears 8. The extremity of the band beyond these ears is bent inwardly so that the same will move upon the inner face of the band at its opposite end when said band is compressed upon the periphery of the tubing. Between the ears 8, a clamping lever 9 is pivotally mounted, the pivoted end of said lever being in the form of a cam 10 having a lip 11, said lip forming a recess or notch 12 in the edge of the cam.

The arm or shank of the lever is bent or curved as indicated at 13, said curved shank being disposed through a loop or link 14. This link at one of its ends is adapted to rest in the groove 12 between the lip 11 and the body of the lever. The other end of the link is pivotally mounted in the opposite end of the clamping band 7, said band being bent around the loop as indicated at 15. Between this extremity of the clamping band and the body thereof, one end of a spring latch plate 16 is disposed, said latch plate being secured to the clamping band by means of a rivet 17. The free end of the spring latch plate 16 terminates in a hook 18. This hook is adapted to engage over the outwardly curved extremity 19 of the clamping lever 9, to retain the same in its effective position and obviate liability of its accidental release.

Upon the inner face of the clamping band 7, one end of a curved leaf spring 20 is secured in any preferred manner. This spring serves as an auxiliary clamp and effectually prevents any longitudinal or rotative movement of the main clamping band 7 upon the periphery of the tubing.

From the foregoing, it is believed that the construction and manner of application of my improved hose or tube clamp will be clearly understood.

It will be obvious that while I have referred to the device as particularly applicable to gas hose or tubing, the same is not limited in its utility to such use but may also be employed in all other instances where a device of this character may be found desirable. In applying the clamp to the tube after the end of the tube has been engaged upon the pipe, the operator simply forces inwardly upon the outer end of the lever, thereby rocking the cam 10 on the inner end of the lever and engaging the lip 11 with the end of the loop or link 14 to draw the ends of the clamping band 7 together, thus forcing the inner face of the band and the auxiliary spring 20 mounted thereon into clamping engagement upon the periphery of the tube. When the lever is moved to its clamping position, the curved or hooked outer end 19 thereof will engage with the hooked extremity of the latch plate 16, and retain said lever in its effective clamping position.

It will be apparent, that owing to the fact that comparatively few elements which are of simple construction, are employed, the invention as a whole may be produced at small manufacturing cost.

It is obvious that the clamping band 7 may be made of any desired diameter as may be necessitated by the particular use to which the invention may be put.

It is to be understood that in putting the invention into practice, various minor modifications in the form, construction and arrangement of the several parts employed may be found desirable, and I reserve the right to resort to such alterations as may fairly fall within the spirit and scope of the appended claims.

Having thus described the invention, what is claimed is:

The hereindescribed hose coupling comprising in combination the following elements to wit: a split spring metal band provided with a pair of laterally projecting ears at one of its ends, a clamping lever having a cam on one end pivotally mounted between said ears, said cam having a lip projecting toward the opposite end of the lever to produce a recess, a link pivotally mounted in the other end of said band engaged in said recess, said lever when moved to its clamping position drawing upon said link to compress the metal band upon the periphery of the hose, a resilient latch plate fixed at one of its ends to the same end of the clamping band as said link but projecting in a relatively opposite direction and terminating at its other end in a hook, said clamping lever having its free end angularly disposed and provided with a laterally extending lip, which, when said lever is in its clamping position is disposed approximately opposite to the pivoted end of the lever, said lip being designed for engagement by the terminal hook of the latch plate whereby said lever is retained in its clamping position against accidental release.

In testimony whereof I hereunto affix my signature in the presence of two witnesses.

ARTHUR S. COUSIN.

Witnesses:
 GEORGE MORD,
 JOSEPH A. PALMA.

---

Copies of this patent may be obtained for five cents each, by addressing the "Commissioner of Patents, Washington, D. C."